Patented Sept. 8, 1936

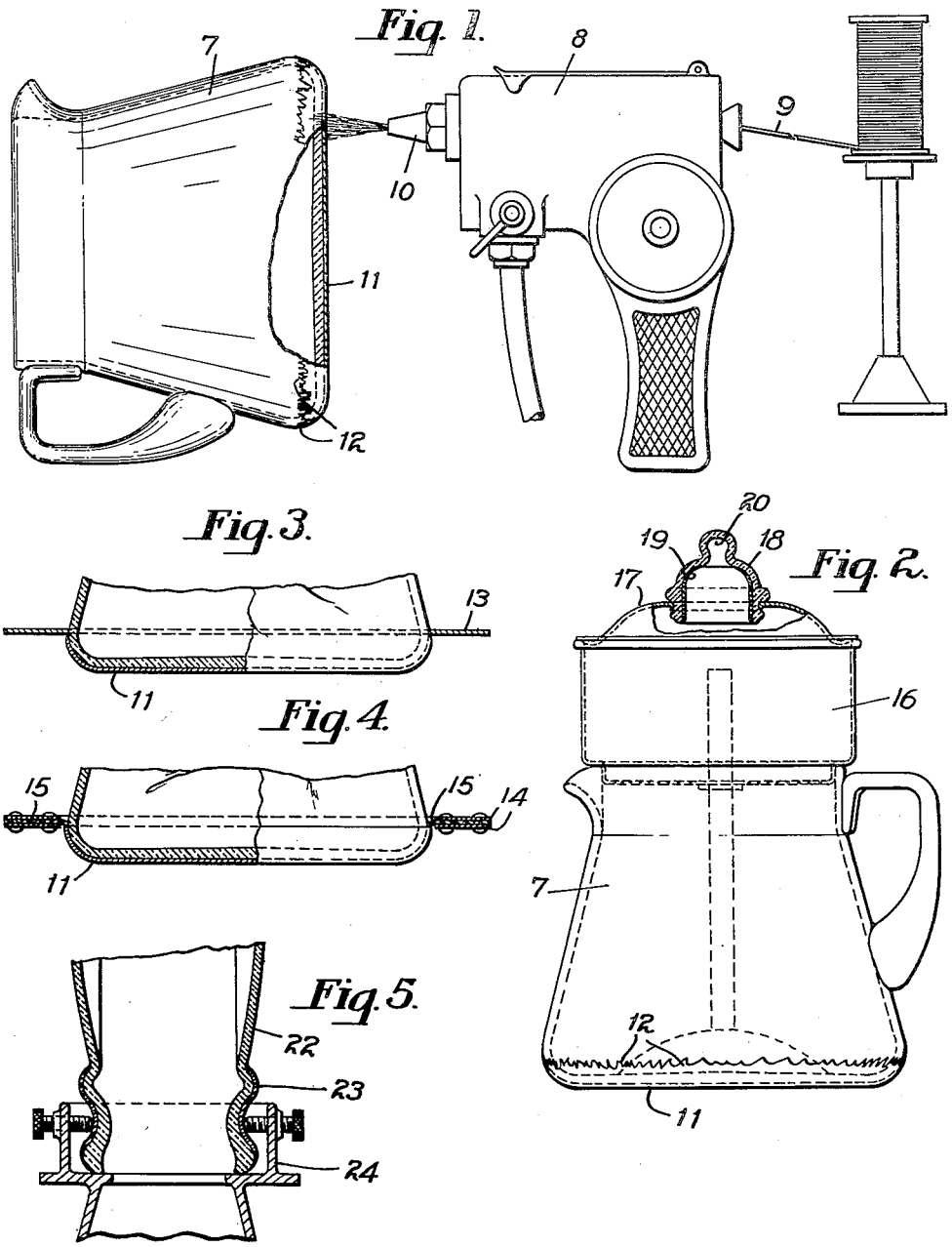

2,053,923

UNITED STATES PATENT OFFICE 2,053,923

GLASS ARTICLES AND METHOD OF MAKING THE SAME

Andrew H. Stewart, Shields, Pa.

Application March 2, 1935, Serial No. 9,121

9 Claims. (Cl. 49—81)

My invention relates to glass articles and method of making the same, and especially to obtaining a tightly adhering, substantially permanent metal layer thereon. This metal layer gives several advantages depending upon the particular article and its uses, and the location and extent of the metal coating. One such advantage is the reinforcing of the glass (or ceramic) article and the spreading and diffusing of thermal shocks and mechanical forces.

Hence one field of the use for my invention is in connection with cooking utensils of glass which are subjected to wide ranges of temperatures, and therefore frequently break by reason of thermal shock. A large percentage of breakage results from the fact that in many instances, certain portions of glassware such as the bottoms of baking vessels are heated very quickly relative to other portions thereof, so that the vessel frequently breaks when first placed upon a stove. Again, when the vessel is removed from the stove, the hottest portion thereof is frequently placed upon a cold surface, so that the heat from that portion is dissipated quite rapidly, and causes cracking of the vessel.

Many attempts have been made to cause metal coatings to adhere firmly to glass, but have failed for various reasons. I have discovered a successful method which consists essentially of applying a molten metal spray to the glass article while it is still hot from its shaping operation.

I will now describe my invention as applied to one example of glass vessel—i. e., a receptacle to be heated and cooled, such as a cooking vessel.

In the accompanying drawing, Figure 1 is illustrative of a manner in which a cooking vessel may be coated with metal; Fig. 2 shows the bowl of Fig. 1, assembled with other elements to form a coffee percolator; Fig. 3 shows a manner of shielding certain portions of the bowl while being sprayed; Fig. 4 shows another form of shield, and Fig. 5 shows an advertising sign globe reinforced by sprayed metal.

The vessel of Fig. 2 represents a coffee percolator having a glass bowl or body portion 7, and is shown as being coated by the use of a spray gun 8 of any suitable type, into which a metal wire 9 is fed. A suitable gaseous blast is supplied and directed through the nozzle 10 of the gun, to produce a flame for melting the wire to blow the molten particles against the surface of the glass. The gun will preferably be held so that the flame will almost impinge on the article, and is simultaneously moved across the surface to be coated. The wire may be of aluminum or other metal.

In most cases, it will be sufficient if only the bottom of the vessel is coated with the metal spray, since the upper portion thereof will not be subjected to so rapid changes in temperature as the bottom portion.

If the metal coating 11 is sprayed close to the lower rounded corner of the vessel, portions of the molten metal will flow short distances along the side of the bowl to form an irregular or deckle edge 12, instead of the edge of the metal being on a continuous circular line around the article. This irregular edge may frequently be desired where there is danger of a continuous unbroken circle of metal causing breakage, because the metal edge may not contract or expand so freely under temperature changes. With the serrated or deckle edge, there will not be so great resistance to expansion and contraction.

Where it is desired to have a smooth, unbroken edge on the deposited metal, a shield 13 of non-combustible material will be placed on the article during the spraying operation, which shield will prevent flow of the metal past the same.

Another form of shield is shown in Fig. 4, wherein two metal plates or rings 14 are secured in clamping engagement with an asbestos ring 15 whose inner edge projects beyond the inner edges of the plates, and is flexible, so that the asbestos ring can have close-fitting engagement with vessels of different diameters, and will more effectively shield the upper portion of the vessel from the sprayed metal.

The vessel of Fig. 2, except for the glass bowl 7 is shown as of somewhat a conventional percolator type, having a metal receptacle and a strainer 16, and a metal lid 17. A glass cap 18 is employed in the usual manner so that the user can see whether the water is being circulated.

The lower portion of the cap 18 has a sprayed layer of metal 19 throughout the major portion of its inner wall, which metal will absorb and dissipate heat from water which is projected upwardly during the coffee-making process, thus reducing the breakage which so frequently occurs in these glass caps. The upper portion of the cap 18 is left uncoated at 20 so that the user will be able to observe whether the water is circulating in the percolator.

The metal is sprayed on the surface of the glass as the glass leaves the forming tool or mold, and while the glass retains a large percentage of its original heat, and will be deposited in the form of a layer or coating. The glass coating being of greater conductivity than the glass, effects heat transfer and diffusion over a great area of the glass surface, thereby protecting the completed article against thermal shock which is occasioned by flame or hot points imposed directly against the bottom of the vessel. Inversely, the shocks sustained by a hot glass surface coming into contact with a relatively cold surface or liquid are greatly reduced by the layer of metal, since the greater heat conductivity of the metal as compared to the glass causes a distribution of temperatures which would otherwise be so localized as to cause breakage.

The deposit of metal can be of desired thickness depending largely upon the degree of strength desired. It is found that an average thickness of .003 inch gives good results so far as diffusion and dissipation of the heat is concerned, and also it materially adds to the mechanical strength. Heavier thicknesses could, of course, be employed, especially where greater resistance to mechanical shocks are desired.

The metal is also of sufficient thickness to greatly strengthen the bottom of the vessel against it being broken when handled roughly, and produces a mirror finish of pleasing appearance which is visible at the interior of the vessel.

The metal may be sprayed in one or more layers, and one layer can be of a different metal than another layer. For example, the first coating can be of aluminum, and a second coating of brass. That part of the metal in direct contact with the glass will have a mirror-like finish, due to the breaking of the metal globules as they strike the surface, that is the pure metal engulfs the small amount of oxide and gives a reflecting surface. The outer surface of the metal can be finished off or decorated by polishing, burnishing, by etching monograms thereon, coating with ceramic colors, etc. It is also possible to apply the metal on the glass surface through stencil sheets to form grids or other designs, especially where it is feasible or desirable to leave small areas of glass exposed, without metal facing.

It is essential to my process and to the obtaining of the desired article, that the molten metal spray be applied while the article is still hot from the shaping operation. I have found in actual trials that it is essential to thus apply the metal coating while the interior of the article is hotter than the exterior, and consequently, heat is passing from the hotter interior of the shaped article to its exterior. For the above reasons I have found it essential in my process that the article be still hot from the shaping operation when the metal coating is applied.

In the case of glass ware, such as cooking vessels and the like, the temperature of the articles as they come from the molds is usually in the neighborhood of 800° F. to 1200° F., though in some cases it may be much hotter and merely cooled sufficiently to be self-sustaining.

There are other important advantages in spraying the articles directly when they come from the mold or forming machine, over the spraying of cold ware or the reheating of the ware for the purpose of spraying the same. In the first place, the articles are quite hot when they come from the molds, and in some cases, the molten glass from which the articles are formed has cooled sufficiently to be merely self-sustaining against deformation. There is, therefore, more effective adhesion or fusion of the metal and glass. The articles being all of approximately a given temperature, there is assurance of uniformity in results. The articles can then be annealed without danger of separation of the metal coating from the glass, and the metal coating also serves to reinforce and protect the glass against breakage during annealing operations.

In those cases where the glass has been heated for the purpose of spraying, there is difficulty in determining when the glass has been brought to the proper temperature for spraying, and furthermore breakage occurs frequently. Heretofore, there has been difficulty in effecting adhesion of the metal to the glass in such manner as to prevent the metal later peeling off in the form of a film. In the case of articles produced by my method, I find that it is impossible to peel the metal coating from the glass article, and it is difficult even to scrape off the metal.

The invention is also useful in connection with the necks of lamp globes and shades or the like, and in the coating of bottles to strengthen the same and render them opaque to keep out light where they are intended to contain materials which are adversely affected by light.

In Fig. 5, I show a glass globe 22 of the canteen type having its neck sprayed with a metal coating 23. This coating strengthens the neck against breakage, when applying fittings thereto, or when placing them in metal holders, such as the holder 24. In the case of illuminating ware, signs and the like, the metal coating can be extended over one side of the article to serve as a reflecting surface. If aluminum is applied as a coating material, the reflectivity will be nearly equal to that of silver.

The invention is, of course, suitable for use with heat-resisting glassware, but ordinary glassware coated in the manner described is fully satisfactory in the respects heretofore described at length.

The metals employed are preferably those having considerable elasticity such as aluminum, zinc, or alloys of those metals. While I prefer to employ those metals which are of such nature that they can be drawn to wire form, harder and more brittle metals will be sufficient for many purposes. By the term "metal" in my claims, I intend to include not only metals but alloys thereof; and my invention may be applied to any type of glass or similar article which is hot shaped.

I claim as my invention:—

1. A shaped glass article having a portion of its surface coated with metal sprayed thereon while the article is still hot from the shaping thereof.

2. A shaped glass article having a portion of its surface coated with metal sprayed thereon while the article is still hot from the shaping thereof, said coating having an inner reflecting surface and an exterior dull matt surface.

3. A shaped glass article having a portion of its surface coated with metal sprayed thereon while the article is still hot from the shaping thereof and before the article has cooled to substantially below 800° F.

4. A shaped glass article having a portion of its surface coated with metal to a thickness of not substantially less than .003 inch, sprayed thereon while the article is still hot from the shaping thereof.

5. A shaped glass article having a portion of its surface coated with metal which has been sprayed thereon while in a molten condition while the article is still hot from the shaping thereof.

6. A glass cooking vessel having portions thereof which are subjected to the greatest heat coated with an adherent coating of metal having a reflecting surface immediately adjacent the surface of the article, and an exterior dull granular surface.

7. In the applying of a metallic coating to glass, the steps consisting of shaping hot plastic glass to a desired form, and then while said article is still hot from shaping driving globules of molten metal against a surface thereof.

8. In the applying of a metallic coating to glass, the steps consisting of shaping hot plastic glass to a desired form, and then while said article is still hot, blasting globules of molten metal against the surface by a fluid under pressure.

9. In the method of applying a metallic coating to and uniting it with glass, the steps consisting of shaping hot plastic glass to a desired form, then while said article is still hot driving globules of molten metal against the surface, and then annealing the metal coated article.

ANDREW H. STEWART.